United States Patent [19]

Nissen

[11] Patent Number: 4,760,090

[45] Date of Patent: Jul. 26, 1988

[54] METHOD OF FEEDING KETOISOCAPROATE TO CATTLE AND SHEEP

[75] Inventor: Steven L. Nissen, Ames, Iowa

[73] Assignee: Iowa State University Research Foundation, Inc., Ames, Iowa

[21] Appl. No.: 838,357

[22] Filed: Mar. 11, 1986

[51] Int. Cl.$^4$ .............................................. A61K 31/19
[52] U.S. Cl. ................................................... 514/557
[58] Field of Search ............................... 514/561, 557

[56] References Cited

U.S. PATENT DOCUMENTS 4,100,161  7/1978  Walser .................................. 424/274
4,100,293  7/1978  Walser .................................. 424/274
4,677,121  6/1987  Walser et al. ........................ 514/561

OTHER PUBLICATIONS

Chawla et al.–*J. Nutr.* (1975) 105:798–803.
Chow et al.–*J. Nutr.* (1974) 104:1208–1214.
Sapir et al. (1977), Metabolism, vol. 26, No. 3.
Walser (1983), New Aspects of Clinical Nutrition (pp. 319–324), "Nitrogen Sparing Effects of Branched Chain Ketoacids" (Karger, Basel).
Boebel et al. (1982), J. Nutr. 112:1929–1939.
Abras et al., (1982), Kidney International, 22:392–397.
Walser (1984), Clinical Science 66:1–15, Editorial Review, "Therapeutic Aspects of Branched-Chain Amino and Keto Acids".

*Primary Examiner*—Frederick E. Waddell
*Attorney, Agent, or Firm*—Tilton, Fallon, Lungmus & Chestnut

[57] ABSTRACT

Cattle and sheep are fed ketoisocaproate (KIC) with a diet of limited leucine content for enhancement of growth and feed efficiency. The method is especially applicable to beef cattle and sheep being raised for meat production, but it can also be used with veal calves and mature sheep being fed for wool production.

22 Claims, No Drawings

METHOD OF FEEDING KETOISOCAPROATE TO CATTLE AND SHEEP

FIELD OF INVENTION

The field of this invention is the raising of cattle and sheep wherein protein-containing feed compositions are fed in combination with a feed adjunct to improve protein utilization for meat production. The invention is particularly concerned with the feeding of alpha-ketoisocaproate to cattle and sheep in conjunction with the feeding of protein.

BACKGROUND OF INVENTION

Keto analogs of essential amino acids have been proposed for use in human nutrition as partial or complete substitutes for the corresponding amino acids, including, for example, leucine, isoleucine, methionine, phenylalanine, and valine. Originally, the use of such keto analogs was proposed by Dr. MacKenzie Walser as supplementation to protein-reduced diets in uremia. See, for example, Walser, et al. *J. Clin. Inv.* (1973) 52: 678–690. Further experiments by Walser and associates demonstrated a nitrogen sparing effect from mixtures of branched-chain keto acids. Saiper and Walser, *Metabolism* (1977) 26: 301–308. Patents have issued to Walser on the use of keto analogs of essential amino acids for promotion of protein synthesis and suppression of urea formation in humans. (U.S. Pat. Nos. 4,100,161 and 4,101,293.) A recent review summarized existing knowledge with respect to the administration of branched-chain keto acids to humans. Walser "New Aspects of Clinical Nutrition," pp. 319–324 (Karger, Basel, 1983).

The keto acid analog of L-leucine is alpha-ketoisocaproate (KIC) which is also sometimes referred to as "ketoleucine." KIC does not have L and D forms as does leucine. It is known that there is an interconversion of circulating KIC and leucine. Published studies have demonstrated that KIC can be substituted in animal diets for leucine providing that larger molar amounts of KIC are used.

Chawla, et al. reported that weight loss by rats being fed a diet deficient in leucine could be prevented by adding KIC to the diet, but the efficiency of substitution was only 20 to 27%. *J. Nutr.* (1975) 105: 798–803. Other studies in rats have demonstrated that KIC is utilized less efficiently than leucine. Boebel et al. reported that the efficiency of KIC in the rat was only about 56% with reference to leucine. Boebel and Baker, *J. Nutr.* (1982) 112: 1929–1939 in Table 8, page 1936. Chow et al. obtained similar results with rat diets, reporting that substitution of KIC for leucine reduced feed efficiency by approximately 33%. Chow and Walser, *J. Nutr.* (1974) 104: 1208–1214.

Walser and associates have published a study of the oral dosing of KIC to rats in which an increased efficiency of utilization of nitrogen and minerals was apparently observed. Abras and Walser, *Am. J. Clin. Nutr.* (1982) 36: 154–161. There are no known reports describing the feeding of KIC to ruminants.

SUMMARY OF INVENTION

This invention is based on several inter-related discoveries concerning the feeding of alpha-ketoisocaproate (KIC) to ruminants. It has been found that KIC can be used as a dietary supplement or feed additive for certain classes of ruminants to obtain an increase in the rate of weight gain and/or feed efficiency, providing the dietary intake of leucine is limited to moderate or low levels. For enhancement of growth and feed efficiency, it is believed that the amount of leucine in the protein of the diet should be limited to not over 12% of the total protein being consumed, and preferably to an amount of leucine less than 10% of the total protein. The method is especially applicable to female ruminants or castrated male ruminants (viz. heifers, steers, ewes, and wethers).

The method of this invention when properly employed is capable of reducing the cholesterol content in the meat of ruminants being raised for meat production. The experimental data obtained with respect to lambs indicates that the amount of cholesterol is reduced in the plasma and in the lean tissue (meat).

It has been further discovered with respect to sheep that the feeding of KIC according to the method of this invention is capable of increasing wool production. This benefit of the method may be obtained in the raising of young lambs for meat production where wool is obtained as a by-product, or with mature sheep being fed for wool production.

The metabolic basis for the benefits obtainable by the method of this invention has not been fully elucidated. The results obtained do not appear predictable on the basis of prior knowledge with respect to keto analogs of amino acids. There is some evidence that the biological mechanisms involved relate to plasma cortisol levels. It has been found that plasma cortisol levels are consistently reduced during the administration of KIC. Reduced cortisol could influence the rate of weight gain and feed efficiency, and also possibly increased wool production, but the reduction in plasma and meat cholesterol does not appear to be directly related. As far as is known, reduced cortisol has not previously been observed in connection with the nutritional use of keto analogs of amino acids.

DETAILED DESCRIPTION

For the purposes of the present invention, the KIC should be in an edible nutritionally-absorbable form. For example, it may be used in its free acid form or as its sodium, potassium, ammonium, or calcium salt. Ammonium and alkali metal salts are more water-soluble, while alkaline earth metal salts such as calcium salt are less water-soluble. These differences in solubility do not appear significant in feeding cattle and sheep. It has been found that the calcium salt is generally comparably effective with the sodium salt, and may have some advantage by dissolving more slowly in rumen fluid.

Alpha-ketoisocaproate (KIC) is available commercially or can be synthesized by known procedures. KIC in the form of its sodium or calcium salts can be purchased from SOBAC, 336 Rue Saint-Honore, Paris, France, and/or through Sigma Chemical Company, St. Louis, Mo.

Sodium and calcium salts of KIC as supplied commercially are substantially pure compounds and are in the form of dry powders. However, high purity is not necessarily required for the purposes of the present invention.

KIC powders can be mixed with dry feeds for ruminants, or the water-soluble KIC salts can be administered by dissolving in drinking water. To assure administration at desired level, it is preferred to mix the dry KIC salt with the dry feed ingredients at a predetermined concentration. The KIC salt can be incorporated by dry blending using standard mixing equipment. The KIC should be substantially uniformly distributed throughout the feed. After mixing, if desired, the feed material may be further processed, such as by conversion to pellets.

The ruminant feed compositions will usually be composed of mixtures of ruminant feed ingredients. The feed compositions may comprise complete feeds, feed concentrates, or protein supplements such as soybean meal. It is important to omit or to use only limited quantities of proteinaceous feed ingredients which are high in leucine content. Such feed ingredients include blood meals, which may contain 16 to 20% leucine, and corn gluten meal containing 18 to 20% leucine (based on the protein dry weight). In contrast, soybean meal contains only about 8 to 9% leucine.

For the purpose of the present invention, it is believed desirable to limit the amount of leucine in the diet of the ruminant to not over 12% by weight based on the dry weight of the total protein being consumed by the animal. The amount of protein can be calculated by determining nitrogen and multiplying by a standard conversion factor of 6.25 (viz. $N \times 6.25$). In preferred embodiments, the amount of leucine is limited to less than 10% by weight of total protein. Consequently, in the formulation of complete feeds or feed concentrates which are to provide a major portion of the diet of the ruminant, it is preferred to maintain the leucine content of the feed composition to not over 12% and preferably less than 10% (based on total protein).

Broadly stated, the method of this invention comprises orally administering to cattle or sheep from 2 to 1000 milligrams (mg) of alpha-keotisocaproate (KIC) per kilogram (kg) of body weight for 24 hours (hrs). The amount of KIC is referenced to sodium KIC. The dietary intake of leucine is limited as described above. In preferred embodiments, the amount of KIC administered to the ruminants is from 10 to 400 mg/kg body weight per 24 hrs. (based on sodium KIC). For purposes of the present application, the specified weight amounts of KIC should be understood to be related to the sodium salt of KIC or a molar equivalent amount of the calcium salt or other salts or derivatives providing nutritionably absorbable and utilizable KIC.

When KIC is combined with the feed material as a uniform admixture, and the feed composition is intended to provide the major protein source for the ruminant diet, the amount of KIC may be specified in relation to the feed composition. For example, the admixed feed composition may contain from 0.01 to 2.0 wt % KIC (sodium KIC basis) in relation to the dry weight of the feed composition. In preferred embodiments, such as in the formulation of complete feeds or feed concentrates, the feed compositions preferably contain from 0.5 to 1.5 wt % KIC (sodium KIC basis). Such feed compositions will usually contain at least 10% protein and may contain up to 24% protein ($N \times 6.25$).

It has been found that KIC to a substantial extent is degraded in the rumen. Therefore in the oral administration of KIC to ruminants it is desirable to employ a sufficient excess to allow for the loss by rumen destruction or by using KIC in a form protected against rumen destruction. For example, KIC tablets may be coated with animal blood or with corn protein (zein). Other proteins can be employed as coating materials which are resistant to rumen breakdown. Polymer coating may also be used such as those known to protect protein against rumen destruction. (See the rumen-protective coatings described in the U.S. Pat. Nos. 4,181,708, 4,181,709, and 4,181,710). The coating employed should be one which is resistant to the mildly acid environment of the rumen while dissolving in the more acid environment of the abomasum. Within the ranges stated the amount of KIC required for effective results can be determined by increasing the dosage until an appreciable reduction in plasma cortisol is observed. Minimized cortisol levels may correspond with maximized benefits of KIC administration.

The method of this invention is especially applicable to the feeding of female and castrated male cattle and sheep, although it can also be used with male ruminants if raised for meat production. More specifically, the method as preferably used with steers and heifers for beef production and with wethers and ewes for lamb meat production and/or wool production. When the method is applied to young lambs, both improvements in meat production in relation to protein intake and increased wool production can be obtained. With mature sheep which are primarily being raised for wool production, the benefit of increased wool production in relation to protein intake is obtained. For meat production with either beef cattle or sheep, an additional advantage is that of reducing the cholesterol content of lean meat. The method is also useable with calves being raised for veal production. Veal calves are suckling calves when they remain monogastric, i.e., they do not develop a rumen, being fed milk or a milk substitute which provides a balanced diet for the veal calves.

Since KIC fed to veal calves is not subject to rumen loss, a lesser amount can be used than with beef cattle. From 2 to 100 mg (sodium KIC basis) per 100 gms body weight can be used. Optimum effectiveness may be achieved with KIC amounts of 10 to 30 mg (sodium KIC basis) per 100 gms body weight for veal calves. On a feed basis, the liquid milk replacer for veal calves may contain from 0.01 to 0.5% (sodium KIC basis) based on the dry matter content of the milk replacer, or preferably from 0.05 to 0.15% KIC on the same basis. Sodium KIC is preferred because of its water solubility. The limitations on leucine in the diets for the veal calves should be observed as previously described for beef cattle and sheep.

The method of this invention is further illustrated by the following examples.

EXPERIMENTAL EXAMPLES

The lambs used in Trial 1 consisted of medium-frame crossbred wethers and ewes weighing 26 to 31 kg. The lambs used in Trial 2 consisted of medium-framed crossbred rams weighing 18 to 25 kg. Each animal was raised as a single. The lambs were housed in a temperature controlled room in individual pens with nipple waterers. When received, the lambs were vaccinated for enterotiximia. They were allowed to adjust to the pens and the environment for 10 days. One day before the trial began, the lambs were sheared and placed on their respective dietary treatments. The lambs were allotted blocking by weight and sex into two dietary treatment groups. Growth and feed consumption were measured by-weekly. All lamb weights were taken after a 12 to 16 hours fast. The animals were slaughtered at 50 kg in the Iowa State University Meat Laboratory facilities, at Ames, Iowa. At slaughter, the lamb's organs and wool were weighed and sampled, loin eye area and back fat measured, and carcasses separated into fat, lean and bone.

The SMB (soybean meal-containing) and the GCM (corn gluten-containing) diets (compositions given in Table A) were fed twice per day in quantities ensuring that feed was before the lambs at all times. The diets were calculated to be equivalent to each other with respect to metabolizable protein, ether extract, fiber, and minerals with the exception of calcium and phosphorous. The CGM diet contained less calcium (0.68 vs 0.74%) and phosphorous (0.30 vs 0.47%), and had a higher calcium to phosphorus ratio (2.29 vs 1.57) than the SMB diet. The CGM diet was calculated to contain slightly more energy (TDN 81.7 vs 79.0, NEm 1.88 vs 1.86, Neg 1.23 vs 1.22). Chemical analysis indicated that the CGM diet contained slightly more crude protein on a dry matter basis than did the SBM diet (20.5 vs 19.8%). The soybean meal ingredient contained about 3.5 wt % leucine, while the corn gluten meal ingredient contained about 15 wt % leucine. The CGM diet was therefore higher in leucine than the SBM diet, containing an estimated 16 wt % leucine as compared with an estimated 8 wt % leucine based on total crude protein for the SBM diet.

TABLE A

| | Diets[1] | | | |
|---|---|---|---|---|
| | SBM[2] | SMB[2] & KIC[3] | CGM[4] | CGM[4] & KIC[3] |
| Feed Ingredients | | | | |
| Molasses (liquid) | 5.0 | 5.0 | 5.0 | 5.0 |
| Corn (fine ground) | 48.5 | 48.5 | 48.5 | 48.5 |
| Soybean Meal (expeller) | 25.0 | 25.0 | — | — |
| Corn Gluten Meal | — | — | 17.4 | 17.4 |
| Alfalfa (dehydrated) | 20.0 | 20.0 | 20.0 | 20.0 |
| Corn Starch | — | — | 7.1 | 7.1 |
| Corn Oil | — | — | 0.5 | 0.5 |
| Limestone | 8.0 | 7.0 | 8.0 | 7.0 |
| Salt | 0.5 | 0.5 | 0.5 | 0.5 |
| Trace Mineral | 0.02 | 0.02 | 0.02 | 0.02 |
| Vitamin A | 0.1 | 0.1 | 0.1 | 0.1 |
| Ketoisocaproate (Ca)[5] | — | 1.0 | — | 1.0 |
| ANALYZED COMPOSITION: | | | | |
| Crude Protein | 19.8 | 19.8 | 20.5 | 20.5 |
| Dry Matter | 88.9 | 88.9 | 89.8 | 89.8 |
| % Leucine | 8.5 | 8.5 | 15.8 | 15.8 |

[1] Feed ingredients given on wt % basis.
[2] Soybean-meal containing diets.
[3] Diets containing calcium salt of alpha-ketoisocaproate (KIC).
[4] Corn gluten meal containing diets.
[5] KIC was mixed into the diets weekly at the level shown.

The results of Trial 1 are summarized below in Table B.

TABLE B

| PROTEIN KIC | ADG[2] | F/G[3] | WOOL[4] | BACK FAT[5] | LEAN[6] | CORTISOL[7] | CHOLESTEROL[8] TISSUE | PLASMA |
|---|---|---|---|---|---|---|---|---|
| SBM 0 | .33 | 5.04 | .176 | .26 | 6.2 | .99 | 80 | 32 |
| SBM 1% | .36 | 4.82*[1] | .216* | .22 | 6.8 | .83* | 44 | 23 |
| CGM 0 | .37 | 4.53 | .158 | .20 | 5.9 | 1.04 | 40 | 33 |
| CGM 1% | .30 | 5.20* | .167* | .18 | 6.0 | .65* | 32 | 32 |

[1] Statistical analysis: *designates $p < .05$, a significant difference between 0% and 1% KIC.
[2] Average daily (24 hrs.) gain (kilograms).
[3] Kilograms feed per kilogram weight gain.
[4] Amount of wool in grams.
[5] Amount of back fat in inches.
[6] Amount of lean meat in kilograms.
[7] Amount of cortisol in plasma (ng/ml).
[8] Amount of cholesterol in lean tissue (ng/mg) and plasma (ng/ml).

The results of Table B indicate that the KIC increased gain and feed efficiency in the SBM diets. The CGM diets did not perform as well when supplemented with KIC, but KIC increased growth in both SBM and CGM diets, and wool growth was increased in both diets. Cortisol was significantly lower in all the KIC supplemented diets.

The results for Trial 2 are summarized below in Table C.

TABLE C

| PROTEIN KIC | ADG[2] | F/G[3] | WOOL[4] | BACK FAT[5] | LEAN[6] | CORTISOL[7] | CHOLESTEROL[8] | LYMPHOCYTE BLASTOGENESIS[9] |
|---|---|---|---|---|---|---|---|---|
| SBM 0 | .304 | 4.76 | .213 | .26 | 5.9 | 2.70 | 75.2 | 5993 |
| SBM 1% | .339*[1] | 4.17* | .267* | .21 | 5.4 | 2.25* | 83.2 | 14625* |
| CGM 0 | .333 | 4.17 | .262 | .29 | 6.1 | 3.77 | 92.2 | 6134 |
| CGM 1% | .308* | 4.35 | .294* | .20 | 5.8 | 2.43* | 81.2* | 18102* |

[1]-[8] See Table B, except cholesterol data is for lean tissue only.
[9] Lymphocyte blastogenesis measured by amount of $^3$H—thymidine incorporated per 2 hrs. of incubation in the presence of phytohemaglutinin (a mitogen that stimulates G-lymphocite division).

The results of Table C indicate that KIC improved performance in the SBM diet but poorer performance was observed in the CGM diet. Wool growth was improved with KIC supplementation in both diets. Cortisol was significantly lower in the KIC supplemented sheep.

COMMERCIAL EXAMPLES

Illustrative diets for use in practicing the method of this invention are set out below:

| DIET A Beef Cattle - Complete Milled Feed (Growing Phase) | |
|---|---|
| Ingredients | % (DM Basis) |
| Corn | 47.91 |
| Corn cobs | 25.00 |
| Soybean meal | 18.00 |
| Cane molasses | 6.00 |
| Limestone | 1.42 |
| Dicalcium phosphate | 0.28 |
| Salt | 0.25 |

-continued

| | |
|---|---|
| Trace mineral salt* | 0.02 |
| Vitamin A Mix** | 0.12 |
| KIC | 1.00 |

Intake of Diet A (24 hrs.)

| Body Weight (Kg) | DM Intake (Kg) |
|---|---|
| 136 | 4.0 |
| 182 | 5.0 |
| 227 | 5.9 |
| 273 | 6.8 |
| 318 | 7.6 |

*Consists of 20% magnesium, 12% zinc, 6.6% iron, 4.4% manganese, 1.3% copper, 0.3% iodine, 0.2% cobalt, and 2.4% calcium.
**Consists of 2,200,000 IU of Vitamin A per Kg.
ME - 2.72 M cal/Kg
CP - 13.9%
Leu - 10.0% of CP
Ca - 0.72%
P - 0.34%

DIET B
Beef Cattle - Complete Milled Feed
(Finishing Phase)

| Ingredients | % (Dm Basis) |
|---|---|
| Corn | 78.78 |
| Corn cobs | 12.00 |
| Cane molasses | 6.00 |
| Urea | 0.80 |
| Limestone | 0.95 |
| Salt | 0.30 |
| Trace mineral salt* | 0.05 |
| Vitamin A Mix** | 0.12 |
| KIC | 1.00 |

Intake of Diet B (24 hrs.)

| Body Weight (Kg) | DM Intake (Kg) |
|---|---|
| 318 | 7.5 |
| 364 | 8.0 |
| 409 | 8.6 |
| 455 | 9.5 |

*Consists of 20% magnesium, 12% zinc, 6.6% Iron, 4.4% manganese, 1.3% copper, 0.3% iodine, 0.2% cobalt, and 2.4% calcium.
**Consists of 2,200,000 IU of Vitamin A per Kg.
ME - 2.83 M cal/Kg
CP - 10.1%
Leu - 10.6% of CP
Ca - 0.42%
P - 0.24%

DIET C
Sheep - Complete Milled Feed

| Ingredients | % (DM Basis) |
|---|---|
| Ground ear corn | 50.00 |
| Can molasses | 4.88 |
| Dehydrated alfalfa | 30.00 |
| Soybean Meal | 12.50 |
| Salt | 1.00 |
| Trace Mineral salt* | 0.50 |
| Vitamin A Mix** | 0.12 |
| KIC | 1.00 |

Intake of Diet C (24 hrs.)

| Body Weight (Kg) | DM Intake (Kg) |
|---|---|
| 30 | 1.3 |
| 35 | 1.4 |
| 40 | 1.6 |
| 45 | 1.7 |
| 50 | 1.8 |
| 55 | 1.9 |

*Consists of 20% magnesium, 12% zinc, 6.6% iron, 4.4% manganese, 1.3% copper, 0.3% iodine, 0.2% cobalt, and 2.4% calcium.
**Consists of 2,200,000 IU of Vitamin A per Kg.
ME - 2.55 M cal/Kg
CP - 15.8%
Leu - 9.0% of CP
Ca - 0.57%
P - 0.31%

The above milk replacer is dissolved in water to a solids concentration of about 20%, and fed to veal calves.

I claim:

1. The method of feeding protein-containing feeds to domestic animals selected from the group consisting of cattle being raised for meat production and sheep being raised for meat and/or wool production to increase the rate of weight gain for the animals being raised for meat production or to increase the amount of wool for the sheep being raised for wool production, wherein the improvement comprises orally administering to said animals from 2 to 1000 milligrams (mg) of alpha-keotisocaproate (KIC) per kilogram (kg) of body weight per 24 hours (hrs) while limiting the dietary intake of leucine to not over 12% of the dry weight of the total protein being fed to the ruminants, said amount of KIC being sodium KIC or the molar equivalent thereof.

2. The method of claim 1 in which from 10 to 400 mg of KIC are administered per kg body weight per 24 hrs.

3. The method of claim 1 in which said leucine intake is limited to less than 10% of the dry weight of the total protein being fed to the animals.

4. The method of claim 1 in which said animals are beef cattle.

5. The method of claim 1 in which said animals are veal calves.

6. The method of claim 1 in which said animals are young lambs being raised for meat production.

7. The method of claim 1 in which said animals are mature sheep being raised for wool production.

8. The method of raising beef cattle to increase the rate of weight gain, said cattle being selected from the group consisting of steers and heifers in which the beef cattle are fed an admixed feed composition containing at least 10% protein by weight on a dry matter basis, wherein the improvement comprises incorporating alpha-ketoisocaproate (KIC) in said feed composition prior to feeding to said beef cattle in an amount of from 0.01 to 2.0 weight percent (wt %) based on the dry weight of the feed composition, said amount of KIC being sodium KIC or the molar equivalent thereof, said feed composition containing not over 12 wt% leucine based on the dry weight of the protein therein.

9. The method of claim 8 in which from 0.5 to 1.5 wt.% of KIC is incorporated in said feed composition based on its dry weight.

10. The method of claim 8 in which said KIC is in the form of its sodium salt.

11. The method of claim 8 in which said KIC is in the form of its calcium salt.

12. The method of feeding domestic animals to increase the rate of weight gain for animals being fed for meat production or to increase the amount of wool for sheep being raised for wool production, said animals being selected from the group consisting of (i) steers and heifers being raised for meat production, (ii) veal calves being raised for meat production, and (iii) wethers and ewes being raised for meat and/or wool production, in which the animals are fed an admixed feed composition containing at least 10% protein by weight on a dry matter basis, wherein the improvement comprises incorporating alpha-ketoisocaproate (KIC) in said feed composition prior to feeding to said animals in an amount of from 0.05 to 1.5 weight percent (wt.%) based on the dry weight of the feed composition, said feed composition containing not over 10 wt % leucine based on the dry weight of the protein therein, said KIC being sodium KIC or the molar equivalent amount of calcium KIC, and said KIC being fed in an amount effective for improving protein utilization.

13. The method of claim 12 in which said animals are beef cattle.

14. The method of claim 12 in which said animals are veal calves being raised for meat production.

15. The method of claim 12 in which said animals are young lambs being raised for meat production.

16. The method of claim 12 in which said animals are mature sheep being raised for wool production.

17. The method of claim 1 in which said KIC is orally administered without rumen protection thereof, the amount so administered being effective to increase the rate of weight gain of the animals being raised for meat production, or being effective to increase the amount of wool of the sheep being raised for wool production.

18. The method of claim 1 in which said KIC is orally administered in a rumen-protected form, the amount so administered being effective to increase the rate of weight gain of the animals being raised for meat production, or being effective to increase the amount of wool of the sheep being raised for wool production.

19. The method of claim 8 in which said KIC is incorporated in said feed composition without rumen protection thereof, the amount of KIC so incorporated being effective to increase the rate of weight gain of the cattle.

20. The method of claim 8 in which said KIC is incorporated in said feed composition in a rumen-protected form, the amount of KIC so incorporated being effective to increase the rate of weight gain of the cattle.

21. The method of claim 12 in which said KIC is incorporated in said feed composition without rumen protection thereof, the amount of KIC so incorporated being effective to increase the rate of weight gain of the animals being fed for meat production, or being effective to increase the amount of wool of the sheep being raised for wool production.

22. The method of claim 12 in which said KIC is incorporated in said feed composition in a rumen-protected form, the amount of KIC so incorporated being effective to increase the rate of weight gain of the animals being fed for meat production, or being effective to increase the amount of wool of the sheep being raised for wool production.

* * * * *